United States Patent [19]

Heithoff

[11] Patent Number: 4,521,235
[45] Date of Patent: Jun. 4, 1985

[54] METHOD AND APPARATUS FOR CONTROLLING WALL LAYER THICKNESS IN A LIQUEFACTION PROCESS

[75] Inventor: Robert B. Heithoff, LaVale, Md.

[73] Assignee: PPG Industries, Inc., Pittsburgh, Pa.

[21] Appl. No.: 555,243

[22] Filed: Nov. 25, 1983

[51] Int. Cl.³ .............................................. C03B 9/14
[52] U.S. Cl. ........................................ 65/29; 65/134;
65/135; 65/162; 65/335; 65/337; 266/213;
432/264
[58] Field of Search ................... 65/29, 134, 135, 335,
65/337, 162; 266/213, 900; 432/264

[56] References Cited

U.S. PATENT DOCUMENTS

| | | | |
|---|---|---|---|
| 2,007,755 | 7/1935 | Ferguson | 65/346 |
| 2,834,157 | 5/1958 | Bowes | 65/135 X |
| 4,028,083 | 6/1977 | Patznick et al. | 65/162 |
| 4,381,934 | 5/1983 | Kunkle et al. | |

FOREIGN PATENT DOCUMENTS

| | | | |
|---|---|---|---|
| 610803 | 6/1978 | U.S.S.R. | 65/335 |
| 727572 | 4/1980 | U.S.S.R. | 65/162 |

Primary Examiner—Robert Lindsay
Attorney, Agent, or Firm—Dennis G. Millman

[57] ABSTRACT

In a process for liquefying glass batch and the like, wherein a layer of batch is maintained as a lining in the liquefaction vessel, the thickness of the lining is monitored by measuring the temperature in a region facing an end portion of the lining. Preferably, a series of thermocouples serves to determine the location of the face of the lining on which liquefaction is taking place.

9 Claims, 3 Drawing Figures

METHOD AND APPARATUS FOR CONTROLLING WALL LAYER THICKNESS IN A LIQUEFACTION PROCESS

BACKGROUND OF THE INVENTION

The present invention relates to monitoring conditions within a chamber for converting pulverulent raw materials to a liquefied state as a first step in a melting process. The invention is generally applicable to processes that involve thermally converting a generally flowable, essentially solid state feed material to a molten fluid. The invention is particularly applicable to melting a transient layer of the material supported by a stable layer of granular, thermally insulating, non-contaminating material, e.g., liquefying a layer of glass batch supported by a layer of material such as a granular batch constituent or glass batch.

U.S. Pat. No. 4,381,934 to Kunkle et al. teaches a method of converting particulate batch materials to a partially melted, liquefied state on a support surface of batch material within a melting chamber. As taught therein, the initial process of liquefying batch material is isolated from the remainder of the melting process and is carried out in a manner uniquely suited to the needs of the particular step, thereby permitting the liquefaction step to be carried out with considerable economies in energy consumption and equipment size and cost. In addition, because thermal energy input is used to perform only the particular liquefaction step, the relationship between this input and other operating parameters is more direct and generally less complex than in a conventional tank-type melting furnace.

In a preferred embodiment of the Kunkle invention, a drum portion of the melting chamber is mounted for rotation so that batch fed into the chamber is held against chamber side walls by rotation of the drum to maintain a stable layer along the interior of the drum. Thermal energy is supplied to the drum interior so that the batch layer encircles the heat source. The liquefaction process is carried out by feeding batch into the drum through a stationary lid while rotating the drum and supplying heat to the drum interior to melt incoming batch material in a transient layer while an underlying layer of batch remains substantially stable and unmelted. As the material is liquefied, it flows downward toward an exit end of the rotating drum.

Central to the Kunkle method is the concept of employing a non-contaminating, thermally insulating layer of granular material (e.g., glass batch itself) as the support surface upon which liquefaction of glass batch takes place. A steady state condition may be maintained in the liquefaction chamber by distributing fresh batch onto a previously deposited batch surface at essentially the same rate at which the batch is melting, whereby a substantially stable batch layer will be maintained beneath a transient batch layer, and liquefaction is essentially confined to the transient layer. The partially melted batch of the transient layer runs off the surface while contacting substantially only a batch surface, thus avoiding contaminating contact with refractories. Because glass batch is a good heat insulator, providing the stable batch layer with sufficient thickness protects any underlying support structure from thermal deterioration.

It would therefore be advantageous to have means for maintaining the stable batch layer within a thickness range sufficient to provide a non-contaminating and preferably thermally insulating layer for supporting the melting material and/or protecting the chamber from excessive heat. It would therefore be desirable to have a method of monitoring this thickness during the melting process so that operating parameters can be adjusted as needed to maintain the desired thickness.

In addition, it would be advantageous to provide facilities for adjusting operating parameters such as energy and batch input in response to changing conditions within the melter for effective control of the batch layer thickness as well as other liquefaction process parameters.

SUMMARY OF THE INVENTION

The present invention relates to a method of and apparatus for determining conditions within a melting chamber of the type which utilizes a stable layer of granular, thermally insulating material, e.g., glass batch material, for supporting a transient layer of melting batch material during liquefaction of the material. Although not limited thereto, the invention is advantageously practiced for controlling an ablation liquefaction process in which the stable batch layer encircles a radiant heat source. The method includes measuring the temperature adjacent to and along the thickness of the stable and transient batch layers, at a plurality of selected positions within the chamber to determine the location of the exposed batch surface, e.g. the surface of the transient layer exposed to the heat source. The location of the surface can then be used to determine the thickness of the batch layers within the chamber.

In a melting chamber mounted for rotation about a vertical axis, wherein rotation of the chamber serves to increase the angle of repose and maintain the stable layer of batch material along chamber side walls, the invention provides a method of determining and controlling the thickness of the stable batch layer. In a preferred embodiment, temperature measurements are taken adjacent to and spaced above the top of the batch layers, e.g., close to the top wall or lid, at radially spaced intervals covering a range of anticipated batch wall thicknesses. The temperatures measured at these locations are then compared to an empirically predetermined temperature profile. The observed temperature profile indicates the position of the melting surface and hence the batch wall thickness. The invention can thus be practiced to control process parameters using temperature measurements to assure a steady state condition in which batch wall thickness is maintained within a predetermined acceptable thickness range.

The invention further includes utilizing measured temperatures to directly control operating parameters using a feedback control loop and appropriate electronic circuitry.

By practicing the present invention, conditions within the melter, particularly the thickness of the stable batch layer, can be monitored during the melting operation, and adjustments in the energy input, batch feed rate or location, and rate of vessel rotation can be made in response to detected changing conditions within the melter for effective process control.

THE DRAWINGS

DETAILED DESCRIPTION OF THE INVENTION

The preferred embodiment of the present invention relates to an ablation liquefaction process such as that taught in U.S. Pat. No. 4,381,934 to Kunkle et al., the teachings of which are hereby incorporated by reference.

For purposes of illustration the invention will be described as practiced with a rotary melter for liquefying glass batch material similar to that disclosed in U.S. patent application Ser. No. 481,970, filed on Apr. 4, 1983, to Kunkle et al., the teachings of which are hereby incorporated by reference. Other processes in which the invention is applicable may include metallurgical smelting-type operations and fusing of single or multiple component ceramics, metals or other materials. However, for the purposes of illustration, the present invention will be described as related to methods for melting glass, e.g., flat glass, container glass, fiber glass or sodium silicate glass, and in particular, to the first stage of melting, i.e., rendering batch materials to a liquefied state.

Figure 1:
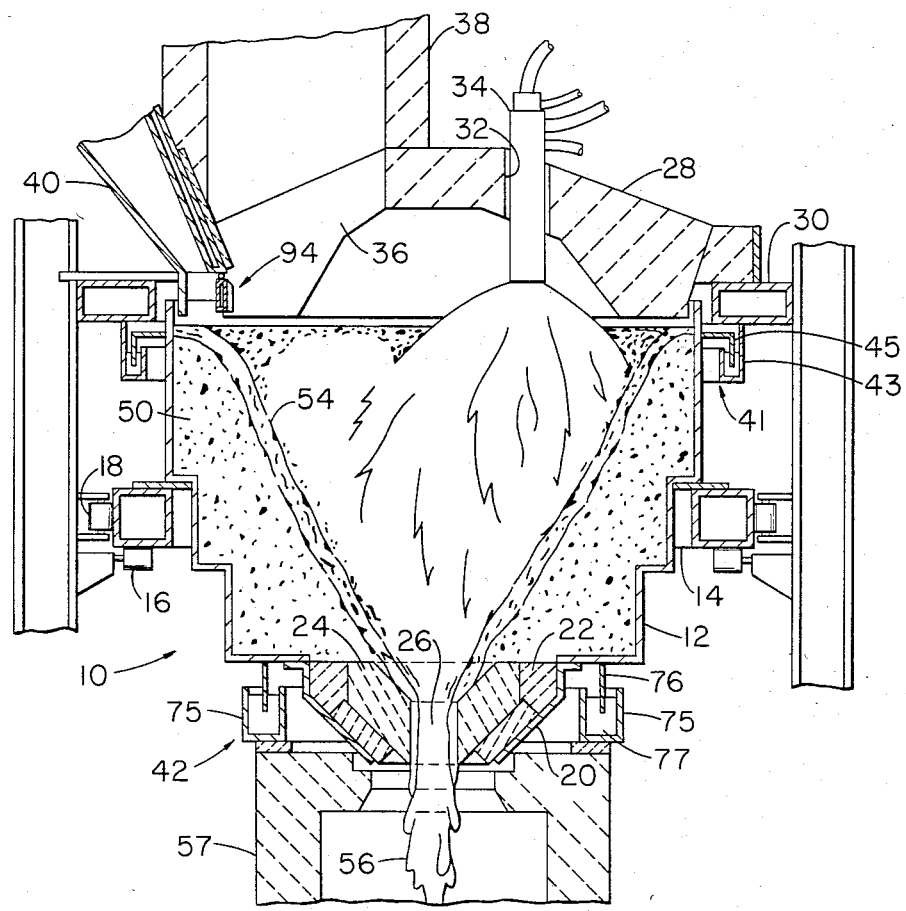
FIG. 1 is a cross-sectional view of a preferred embodiment of melting vessel in which the present invention may be incorporated.
Figure 2:
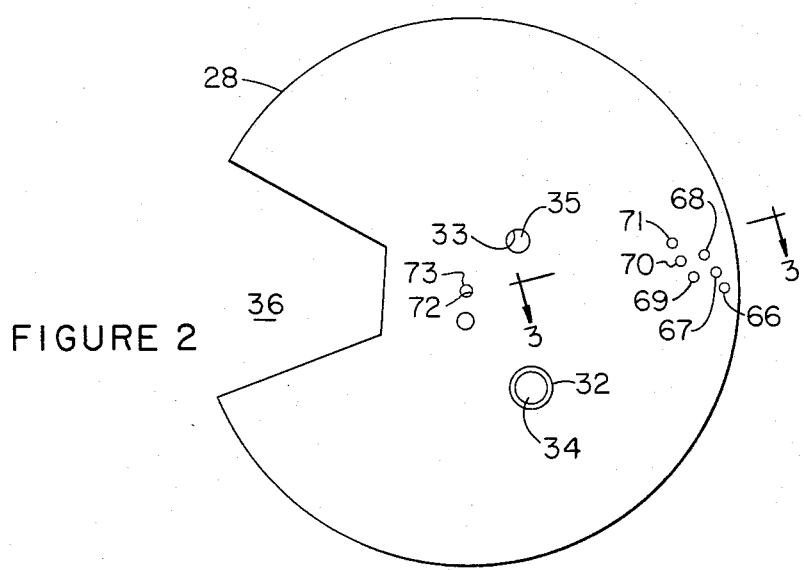
FIG. 2 is a plan view of the lid of the melting vessel of FIG. 1, showing a typical arrangement of batch wall thickness detector means in accordance with the present invention.

With reference to FIG. 1, the melter 10 may include a steel drum 12 having stepped sidewalls so as to decrease the amount of mass being rotated. The drum 12 is supported on a circular frame 14 which is, in turn, mounted for rotation about a generally vertical axis, corresponding to the centerline or axis of symmetry of the drum, on a plurality of support rollers 16 and aligning rollers 18. A bottom section 20 may be detachably secured to the drum 12. The bottom section 20 may be lined with an annulus of refractory material 22 such as castable refractory cement in which is seated a ring-like bushing 24 of an erosion resistant refractory material. The bushing 24 may be comprised of a plurality of cut pieces of ceramic. An open center 26 in the bushing 24 comprises the outlet opening from the liquefaction chamber. An upwardly domed refractory lid 28 is provided with stationary support by way of a surrounding frame member 30. The lid includes openings 32 and 33 for inserting primary burner 34 and auxiliary burner 35 (FIG. 2). The exhaust gases escape upwardly through an opening 36 through the lid 28 and into an exhaust duct 38. The opening 36 may also be utilized for feeding the raw materials to the liquefaction chamber, and, as shown in FIG. 1, a feed chute 40 is provided for this purpose. A pivotable batch deflector 94 may be provided at the end of the chute 40.

To isolate the interior of the liquefaction chamber from the exterior ambient conditions and to trap any dust or vapors that may escape from the vessel, upper and lower water seals 41 and 42 respectively are provided. The upper seal comprises a trough 43 affixed to the frame 30 and a flange 45 attached to the drum 12 and having a downwardly extending portion immersed in a liquid (e.g., water) contained in the trough 43. The lower seal similarly includes a trough 75 and flange 76 immersed in liquid 77.

As shown a stable layer of batch material 50 lines the interior of the drum 12. Before the melter 10 is heated, the stable layer of batch material 50 is provided in the melter by feeding loose batch through the feed chute 40 while the housing is rotated. The loose batch assumes a generally parabolic contour as shown in FIG. 1. The batch material may be wetted, e.g., with water, during the initial stage of forming the stable layer to facilitate cohesion of the layer along the sidewalls.

During the melting process, continuous feeding of batch to the melter 10 results in a falling stream of batch that becomes distributed over the surface of the stable batch layer 50, and by the action of the heat, e.g., from the primary burner 34 and the auxiliary burner 35, becomes liquefied in a transient layer 54 that runs to the bottom of the vessel and passes through the open center 26. The liquefied batch 56 falls from the exit opening and may be collected in a collection vessel 57 for further processing. With this arrangement, high thermal efficiency is provided by encircling the heat source with the batch material being melted, and the transient batch layer 54 being melted is distributed within the vessel by means of its rotation. Thus, the material initially remains exposed to the heat until it becomes liquefied, whereupon it flows out of the liquefaction zone.

Combinations of properties analogous to those in the liquefaction of glass batch may be found in the fusing of ceramic materials and the like and in metallurgical smelting-type operations. As will be appreciated, the invention is not limited to the melting of glass batch materials. Whatever the material to be liquefied, the invention may be advantageously practiced for control of a liquefaction process carried out with a transient layer of batch material supported by a stable layer of granular, preferably non-contaminating material. The preferred stable granular layer provides thermal insulation as well as a non-contaminating contact surface for the transient batch layer, and most preferably the stable layer includes one or more constituents of the batch material. It is desirable for the thermal conductivity of the material employed as the stable layer to be relatively low so that practical thicknesses of the layer may be employed while avoiding the need for wasteful forced cooling of the vessel exterior. In general, granular or pulverulent mineral source raw materials provide good thermal insulation, but in some cases it may be possible to use an intermediate or product of the melting process as a noncontaminating stable layer. For example, in a glassmaking process, pulverizing cullet (scrap glass) could constitute the stable layer, although a thicker layer would be required due to the higher thermal conductivity of glass as compared to glass batch. In metallurgical processes, on the other hand, using a metallic product as the stable layer would entail unduly large thicknesses to provide thermal protection to the vessel, but some ore materials may be satisfactory as insulating layers.

Turning now to specific features of the present invention, process parameters should be controlled to maintain desired steady state conditions within the melter, e.g., desired batch wall thickness. For this reason, it is important to monitor the thickness of the batch wall during the melting process. It has been found that temperatures adjacent to the upper edge of the batch wall provide a good indication of the location of the batch wall boundary within the drum 12, and further, that the boundary of the batch wall at the top of the drum is a good indication of batch wall thickness throughout the drum.

Figure 3:
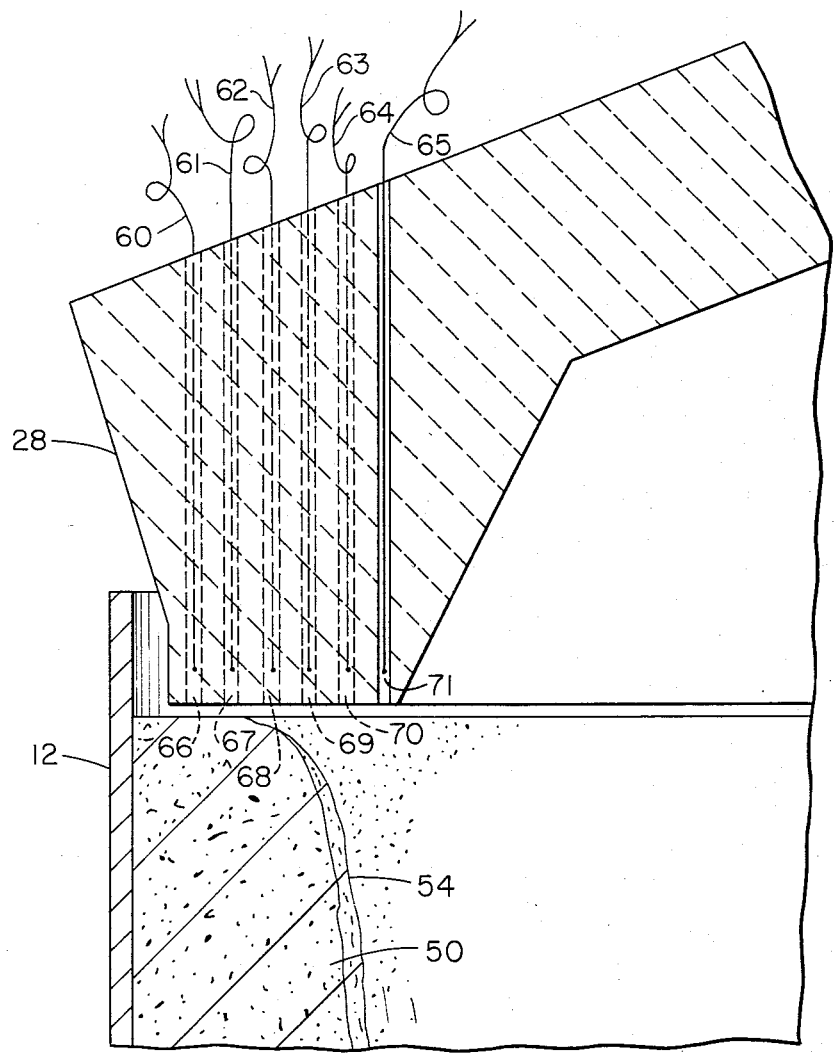
FIG. 3 is an enlarged cross-sectional view taken along line 3—3 in FIG. 2, showing details of a preferred batch wall thickness detector arrangement in accordance with the present invention.

As shown in FIGS. 2 and 3, a plurality of wall thermocouples 60 through 65 are inserted through holes 66 through 71, respectively, in the lid 28. A centrally located thermocouple 72 is mounted in opening 73 for measuring melter temperature adjacent to the interior face of the lid 28 prisarily for detecting overheating of the lid and to provide a reference temperature. Each of the thermocouples 60 to 65 is spaced a different radial distance from the axis of rotation of the drum 12. For convenience of construction, the illustrated arrangement locates the thermocouples along two parallel chords of the circle defined by the lid 28, but they could be arranged in any pattern. Nor do the thermocouples need to be clustered in one area, although doing so may render their readings more consistent among each other.

The position and number of thermocouples depends upon factors such as anticipated batch layer thicknesses, size of the melter, anticipated throughput, and the amount of accuracy needed for the thickness determination. A plurality of thermocouples is preferred for providing greater information and flexibility. The thermocouples are preferably arranged so as to face the inlet end of the batch layer near its interface with the central cavity over the range of expected batch layer thickness fluctuations. The thermocouples are preferably uniformly spaced apart in the radial direction, the magnitude of the spacing depending on the number of thermocouples. By way of example, a radial spacing of one inch (2.5 centimeters) has been found adequate in the embodiment shown in the drawings. In that example, the batch wall thickness may be expected to vary from about 2 inches to 6 inches (5 to 15 centimeters), and six thermocouples are provided at distances from the drum ranging from 2 to 7 inches (5 to 18 centimeters). Although a plurality of thermocouples is preferred, it should be understood that experience with a particular melter and lid configuration may permit the use of a single thermocouple located within the range of anticipated batch wall thicknesses. Variations in temperature at this intermediately placed single thermocouple may reflect changes in batch wall thicknesses sufficiently for purposes of process control. Thus, a single batch wall thermocouple may suffice in some cases to determine whether a batch layer has increased or decreased beyond an upper or lower process limit, but increasing the number of thermocouples provides more detailed information about batch layer thicknesses outside the predicted or anticipated range.

Each of the thermocouples is preferably capable of withstanding maximum operating temperatures adjacent to the hot face of the lid 28, e.g., about 3000° F. (1650° C.). A suitable high temperature thermocouple may include a platinum 6% rhodium/platinum 30% rhodium junction, commonly known as a "type B" thermocouple in accordance with the nomenclature of the Instrument Society of America, encased in a platinum clad protection tube. The thermocouple junctions on the wall thermocouples 60–65 preferably do not extend beyond the lid interior face so that they are protected from contact with the batch wall.

For purposes of maximizing response time of the thermocouples to changes in temperature, it is preferred that the measuring junctions be located as close to the hot face 74 as practical, consistent with protecting them from physical damage. The central thermocouple 72 junction may extend into the chamber, however, for a more accurate reading of internal chamber temperature because of the absence of a batch wall near the hot face of the center of the lid. It should also be encased in a protection tube similar to that used for the wall thermocouples.

The temperature of the batch wall boundary is initially determined by visual observation of the location of the batch wall boundary near the top of the chamber while measuring the temperature at this location during the melting process. In this manner, a direct correlation between a measured temperature and the batch boundary zone can be made. With this arrangement, it has been found that the measured temperature at or close to the batch wall boundary, e.g. close to the transient layer 52, is an empirically determinable temperature which for a given chamber and lid configuration is substantially independent of changing operating conditions. It has been observed that configuration of the lid, i.e., whether domed or flat, affects the absolute value of this empirically determined melting surface temperature.

The importance of knowing the location of the melting surface will be more fully appreciated in light of the following discussion of the operation of the melter 10. For purposes of clarity, it will initially be assumed that a given throughput is desired and hence, the rate and composition of batch entering the melter is maintained constant, and further, that the speed of rotation of the drum is also held constant.

With these assumptions in mind, batch wall thickness is primarily a function of melting rate, which in turn is a function of the amount and manner of thermal energy input to the melter. A melting rate which is too high can result in a decrease in thickness of the stable batch layer with a resulting loss in thermal insulation of the melter sidewalls, which could lead to drum damage. A melting rate which is too low results in inefficiencies. More particularly, as the batch wall thickness increases, the surface area of the transient layer decreases, so that less batch is exposed to radiant heat, with an undesirable decrease in melting rate as well as high lid temperatures, risking damage to the lid. Therefore, one mode of process control, i.e., maintaining a batch wall thickness within an acceptable range, is to adjust the rate of energy input in response to increases or decreases in thickness. Conventional automatic process control means may be used for that purpose. Alternatively, a control system responsive to the batch wall thickness can be provided to vary the rate of batch feed or the location of batch feed as determined by the deflector 94.

When using fuel fired burners as the source of thermal energy, e.g., the burners 34 and 35, it is desirable to adjust the firing rate in response to changes in batch wall thickness. For example, if an increase in batch wall thickness occurs, resulting in a corresponding decrease in surface area of the batch layer available for melting, keeping the firing rate and batch feed rate constant without altering other process parameters, e.g., drum rotational speed, could cause the batch wall to increase to a thickness greater than the preferred thickness, and a higher than desirable temperature within the melter, e.g., as measured adjacent to the interior hot face of the melter lid 28 by the central thermocouple 72. On the other hand, if an increase in the firing rate is more than that required to melt the incoming batch at a particular batch feed rate, the temperature at the central thermocouple 72 would also increase.

Failure to quickly detect the decrease in batch wall thickness and alter process parameters, e.g., by decreasing the firing rate, could lead to a batch wall having less than the preferred thickness. As noted above, a wall thickness that is too great or too small could lead to overheating the melter lid 28 and/or the drum 12.

It should be noted that, in view of the preceding discussion, an increase in the center of the lid temperature alone does not distinguish between an over-firing or under-firing condition and is not therefore sufficient for process control. On the other hand, practicing the instant invention provides an accurate picture of conditions within the melter by distinguishing between a batch wall being too thick and one which is too thin when the temperature close to the center of the melter, e.g., at the thermocouple 72, is excessive.

The above embodiments of the invention were presented to illustrate features of the invention and are not limiting thereto, the scope of the invention being defined by the claims which follow.

I claim:

1. A method of thermally liquefying pulverulent materials comprising: maintaining a lining of pulverulent material on a support surface, feeding pulverulent material onto the lining to form a transient layer thereon, heating the transient layer so as to liquefy the transient layer and cause it to flow off the lining, determining the thickness of the lining by measuring temperature at a location spaced from and facing an end of the lining so as to detect temperature changes corresponding to changes in thickness of the lining, and adjusting operation of the liquefaction process in responses to the measured temperature so as to maintain controlled liquefying conditions.

2. The method of claim 1 wherein the temperature measurements are taken at a plurality of locations spaced apart in the direction of batch wall thickness.

3. The method of claim 1 wherein the lining is rotated about a central cavity and the temperature measurement is taken at a stationary location.

4. The method of claim 3 wherein the rotation is about a substantially vertical axis, the pulverulent material is fed onto an upper portion of the lining, and the temperature measurement is taken at the upper end of the lining.

5. The method as set forth in claim 1 wherein the rate of heating is controlled in response to the thickness of the melting surface as detected by the temperature measuring step.

6. The method as set forth in claim 4, wherein the lining is maintained within a rotating drum, and a stationary lid is supported in spaced relationship to the drum portion at the upper end of the drum, and wherein the process further includes rotating the drum portion, and wherein the monitoring step is practiced at predetermined radially spaced intervals along an interior face of the lid portion.

7. An apparatus for liquefying thermally meltable material deposited on a surface of a pulverulent layer supported by a structurally stable member comprising: means for supplying heat to liquefy the deposited material; means for monitoring temperature at a region opposite an end portion of the layer to detect temperature changes corresponding to changes in thickness of the layer; and means for controlling the heat supplying means in response to changes in the thickness.

8. The apparatus as set forth in claim 7, wherein the structurally stable member includes a side wall of a melting chamber and wherein the chamber further includes a top wall spaced from the side wall, and the means for monitoring temperature includes a plurality of temperature sensing means carried by the top wall facing the layer adjacent to the side wall.

9. The apparatus as set forth in claim 8, wherein the melting chamber side walls are mounted for rotation about a central cavity such that the pulverulent layer is retained along the side wall by rotation of the chamber, further including means for feeding the meltable material into the chamber.

* * * * *